United States Patent [19]
Selzer

[11] 3,901,362
[45] Aug. 26, 1975

[54] CURVED THRUST PLATE ON CLUTCH THROWOUT BEARING

[75] Inventor: Robert J. Selzer, Fort Wayne, Ind.

[73] Assignee: International Harvester Company, Chicago, Ill.

[22] Filed: Jan. 17, 1974

[21] Appl. No.: 434,311

[52] U.S. Cl................................. 192/98; 192/99 S
[51] Int. Cl.² ........................................ F16D 23/14
[58] Field of Search ........ 192/99 R, 99 S, 98, 89 A; 74/569

[56] References Cited
UNITED STATES PATENTS

| | | | |
|---|---|---|---|
| 1,882,897 | 10/1932 | Reed.................. | 192/98 X |
| 2,725,965 | 12/1955 | Binder................ | 192/98 X |
| 2,995,406 | 8/1961 | Pitner................. | 192/98 X |
| 3,212,611 | 10/1965 | Ruoff et al........... | 192/98 X |
| 3,277,988 | 10/1966 | Pitner................. | 192/98 X |
| 3,333,664 | 8/1967 | Chapaitis............. | 192/99 R X |

Primary Examiner—Benjamin W. Wyche
Attorney, Agent, or Firm—Frederick J. Krubel; Floyd B. Harman

[57] ABSTRACT

A curved contact surface insert for the thrust plate of a clutch release bearing of an automotive vehicle. The insert is formed with a generally cylindrical raised surface that is contacted by the yoke for the clutch release bearing. The curved contact surfaces causes the effective lever arm of the yoke to describe a shallower arc than in the conventional structure. This requires less physical effort by the vehicle driver to effect disengagement of the clutch.

12 Claims, 8 Drawing Figures

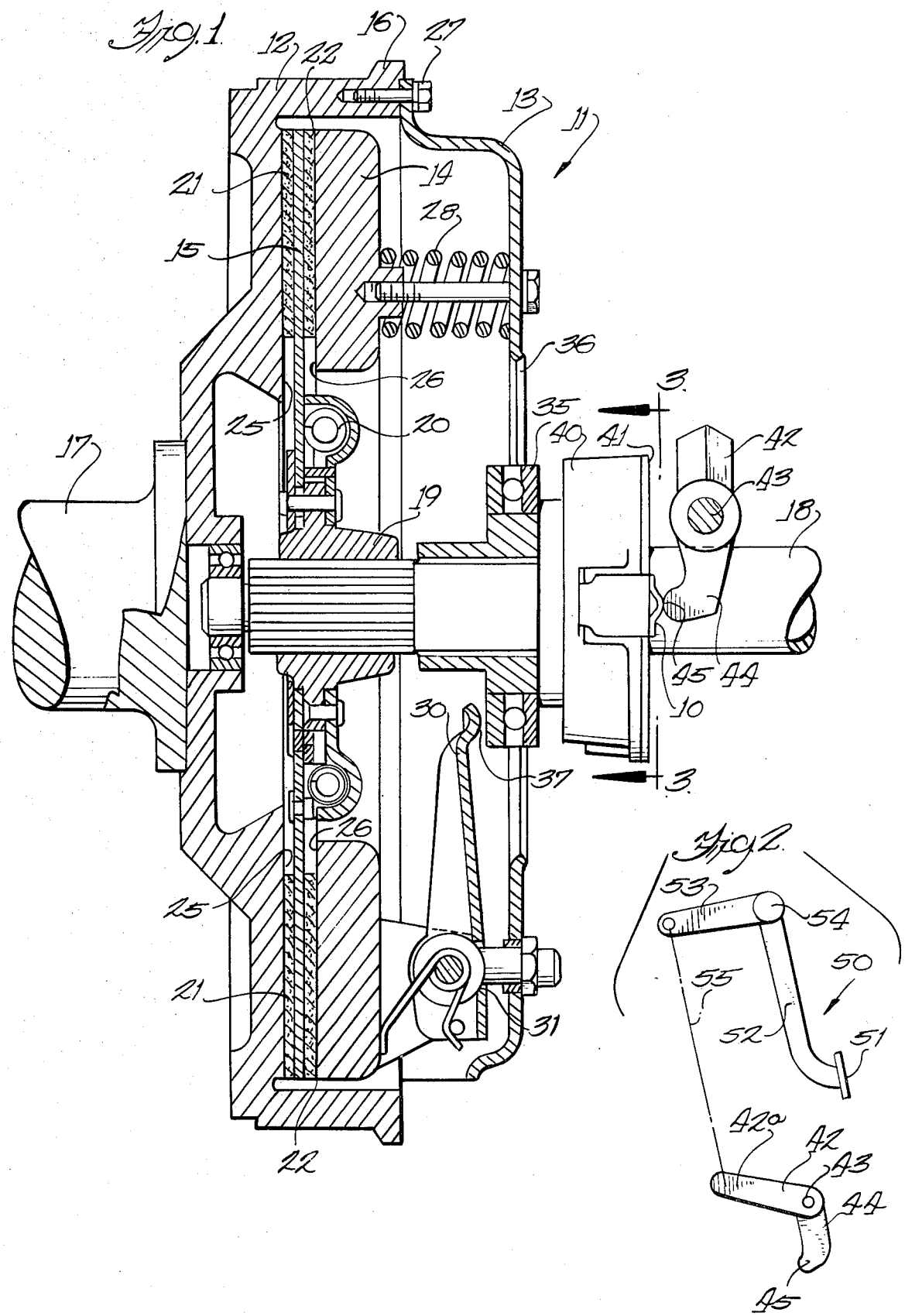

CURVED THRUST PLATE ON CLUTCH THROWOUT BEARING

BACKGROUND OF THE INVENTION

The invention relates generally to the field of clutches and power-stop controls for automotive vehicles. More particularly, the invention relates to clutch operators and elements for effecting the manual disengagement of a friction clutch that is spring engaged to complete a driving power train.

In many conventional vehicle clutch structures, the clutch is engaged by a spring biased pressure plate which acts against a friction disc connected to the driven shaft of the vehicle. A plurality of levers are commonly mounted in association with the pressure plate to act thereon for causing disengagement of the clutch. The force to effect disengagement is provided by the vehicle driver through actuation of the clutch pedal. This force is transmitted through a suitable linkage to a clutch release yoke or fork which in turn acts against a thrust plate and a clutch release or throw out bearing to actuate the levers. The clutch release fork is pivotally mounted and describes an arcuate motion in moving the thrust plate. The active length of the lever arm of the fork increases as the thrust plate and bearing are moved to effectuate release of the clutch. This requires that the force exerted by the vehicle driver be increased as the clutch pedal is depressed to compensate for this increased length of lever arm.

SUMMARY OF THE INVENTION

It is a primary object of the present invention to provide a means for effectively changing the active length of the clutch release yoke lever arms, and thereby cause a reduction of the force required to be exerted by the driver to effect disengagement of the clutch.

It is a more particular object to provide an insert for the clutch release thrust plate that has a raised cylindrical contact surface adapted to be engaged by the release fork and effective to cause the active length of the lever arm to describe a significantly shallower arc in its clutch disengaging motion.

BRIEF DESCRIPTION OF THE DRAWINGS

FIG. 1 is a longitudinal sectional view of a vehicle clutch structure embodying the present invention;

FIG. 2 is a schematic diagram showing the mechanical linkage connecting the vehicle clutch pedal to the clutch release bearing yoke;

DESCRIPTION OF THE PREFERRED EMBODIMENT

Figure 3:
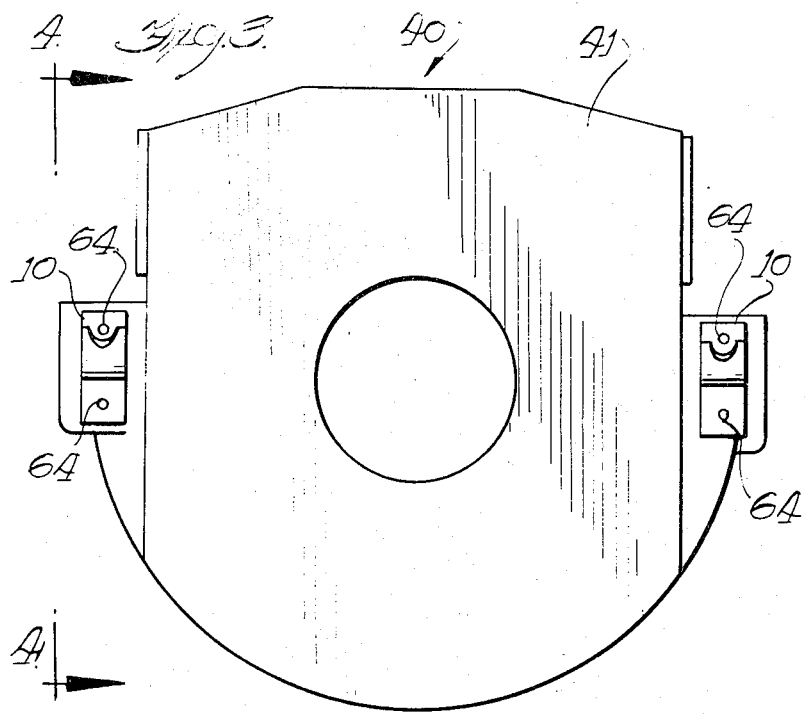
FIG. 3 is an enlarged elevation view of the clutch release thrust plate taken on line 3—3 of FIG. 1.
Figure 4:
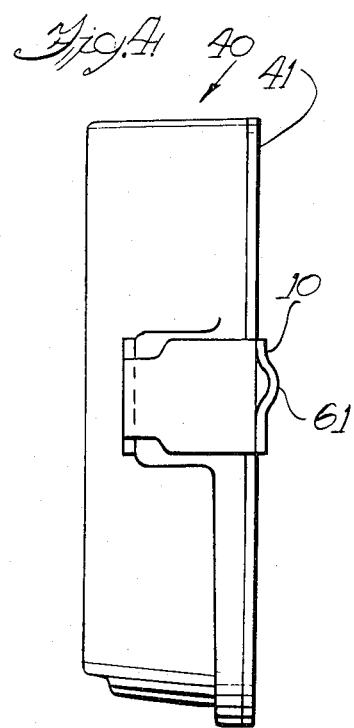
FIG. 4 is a side view of the release thrust plate taken on line 4—4 of FIG. 3.
Figure 5:
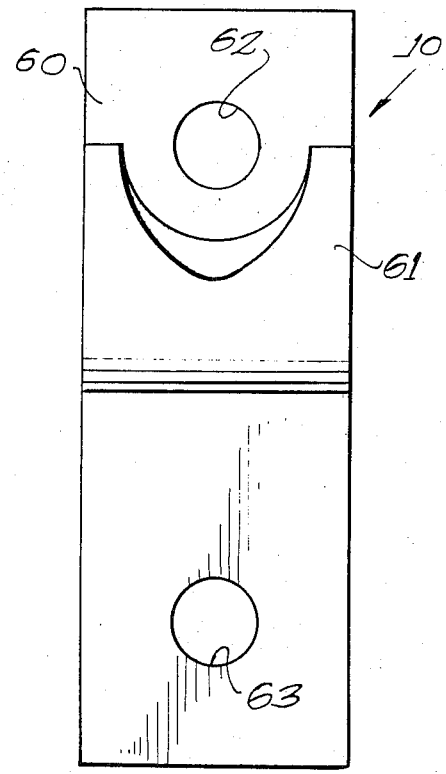
FIG. 5 is an enlarged elevation view of the curved thrust plate insert shown on FIG. 3.
Figure 6:
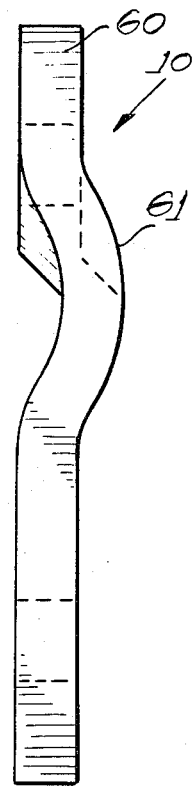
FIG. 6 is a side view of the thrust plate insert taken on line 6—6 of FIG. 5.

The curved thrust plate insert 10 of the present invention is adapted to be employed in an existing clutch structure such as is shown in section in FIG. 1 and designated generally by the numeral 11.

The clutch structure 11 comprises a flywheel housing 12, a shroud 13, a pressure plate 14, and a driven friction plate or disc 15. The flywheel housing 12 is formed on its outer periphery with a conventional starter gear 16 and is attached at its hub to an input shaft 17 connected to the vehicle engine (not shown). The driven plate 15 is drivingly connected to an output shaft 18 by means of a splined sleeve 19 through a plurality of vibration dampener springs 20. The driven plate 15 has discs or buttons of friction facing material 21 and 22 rigidly attached on either side of the central plate.

The interior of the flywheel housing 12 is formed with a flat annular surface 25 adapted to be engaged by the friction disc 21, and the pressure plate 14 is formed with a flat annular surface 26 adapted to engage the friction disc 22. The shroud 13 is rigidly attached to the flywheel housing 12 by means of a plurality of bolts 27. A plurality of clutch-engaging springs 28 are disposed under compression between the shroud 13 and the pressure plate 14 and are effective to squeeze the driven plate 15 between the flywheel housing 12 and the pressure plate 14 so as to form a driving connection between the input shaft 17 and the output shaft 18.

A plurality of radially extending, circumferentially spaced clutch release levers 30, only one of which is shown in FIG. 1, are mounted on the interior of the shroud 13 on bolts 31. The levers are connected to the pressure plate 14 in a conventional manner and are effective when actuated from their clutch engaged positions toward their clutch released positions to lift the pressure plate 14 away from the plate 15 against the compressive force of the springs 28, thereby breaking the driving connection between the shafts 17 and 18.

An annular clutch release or throw-out bearing assembly 35 is suitably mounted on a generally cylindrical sleeve which, in turn, is mounted on the output shaft 18 and is adapted to slide longitudinally thereon over some limited range of travel. The shroud 13 is formed with a circular opening 36 to permit such travel. One race of the bearing assembly 35 contacts the radially innermost tips 37 of the clutch release levers 30 to cause disengagement of the clutch 11 when the cylindrical sleeve and the bearing assembly 35 mounted thereon are moved to the left, as shown in FIG. 1. An annular thrust plate or collar 40 is also mounted on or integrally formed with the cylindrical sleeve upon which the bearing assembly 35 is mounted. The collar 40 surrounds the output shaft 18 and is axially slidable in unison with the release bearing assembly 35. The output shaft 18 rotates freely within the cylindrical sleeve as in conventional friction clutch assemblies and the cylindrical sleeve is fixed against rotation but is mounted to slide longitudinally on the output shaft 18. The collar 40 is provided with generally flat, transversely spaced portions which, as illustrated, are contained in a flat generally annular face 41 which lies generally in a plane substantially perpendicular to the rotational or longitudinal axis of the output shaft 18.

A shifter yoke or fork 42 is pivotally mounted on a transverse pin 43 above the output shaft 18 and is adapted to be moved arcuately or swung about the pin 43 between positions corresponding to the clutch fully engaged and disengaged conditions of the clutch. Each terminal end of each of the legs 44 of the yoke or fork 42 is formed with a toe portion 45 partially defined by a cylindrical or spherical contact surface which is operatively engageable with the collar 40 to effect axial movement of the bearing assembly 35 and disengagement of the clutch.

In the present day production clutch structures of the type to which the present invention relates, the toe portions 45 of the fork 42 bear directly against the flat face or surface 41 of the thrust collar 40. The operation of such clutch structures is improved by interposing the curved contact surface inserts 10 between the toe portions 45 and the thrust collar 40, as will now be described.

Referring to FIG. 2, there is shown a schematic diagram of the mechanical linkage connecting the release bearing shifter yoke or fork 42 to the vehicle clutch pedal 50. The clutch pedal 50 includes a foot-receiving plate 51 rigidly attached to a lever arm 52 which, in turn, is connected to a bell crank 53 and pivotally mounted on a pin 54. The bell crank 53 is connected by a suitable rod or link 55 to the shifter yoke arm 42a.

When the vehicle driver depresses the foot-receiving plate 51, this motion causes the lever arm 52 and bell crank 53 to turn clockwise about the pivot 54, as viewed in FIG. 2. The turning of the crank 53 pulls the rod 55 which acts on the shifter yoke 42 causing it to turn clockwise about the pin 43. The arcuate motion of the legs 44 of yoke 42 is transmitted through the toe portions 45 to the thrust collar 40 causing disengagement of the clutch 11. Obviously, the force exerted by the driver's foot must be sufficient, after being transmitted through the linkage described, to overcome the force of compression of the springs 28 to cause the clutch 11 to disengage. When driving in heavy traffic, or under conditions where the frequent shifting of gears is necessary, the continuing operation of the clutch pedal 50 can become fatiguing to the driver. The incorporation of the present invention in the clutch disengaging mechanism can reduce the force required to be exerted by the driver's foot to release the clutch by as much as 8 to 10 percent below that required in a conventional clutch structure of the same size or capacity.

In order to achieve such a reduction in the force required to effect release of the clutch, the thrust collar 40 is modified according to the present invention by the insertion of a pair of curved contact surface inserts 10 as shown in FIGS. 3 to 6. Each of the inserts 10 comprises a generally rectangular, flat body 60 formed with a raised generally cylindrical surface 61 and holes 62 and 63. The longitudinal axis or the axis of generation of each surface 61 is substantially normal to the longitudinal axis of the shaft 18 and is vertically spaced above such longitudinal axis of shaft 18. It is to be understood, however, that the surface 61 could have a shape or configuration other than cylindrical without departing from the spirit and scope of the invention. In fact, the surfaces 61 could be flat and thus, in effect, have axes of generation at infinity. The holes 62 and 63 provide easy access for mounting the insert 10 on the thrust collar 40 by means of screws or bolts 64. The raised surface 61 need not be precisely cylindrical, but will be assumed to be so for purposes of the description to follow. Moreover, preferably the radius of curvature of each surface 61 is the same as the radius of curvature of the contact surface partially defining each toe portion 45 of the fork 42.

Figure 7:
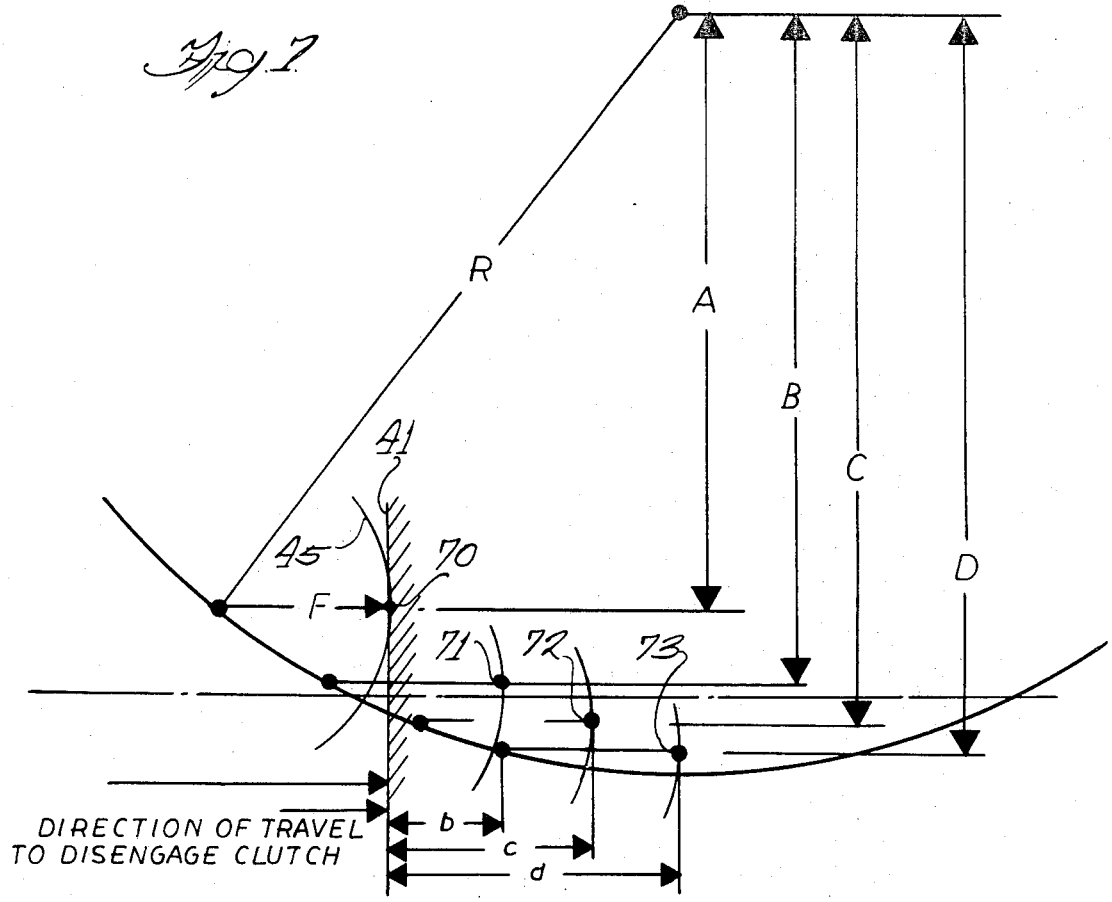
FIG. 7 is a schematic diagram illustrating the effective torque radius of a conventional release bearing yoke through several stages of operation.

Referring to FIG. 7, there is illustrated a schematic diagram of the torque parameters of the shifter yoke 42 for several sequential stages of operation in a conventional clutch not embodying the invention. The actual radius of a leg 44 is represented by "R". The curved surface of the toe 45 of each of the legs 44 bears against the flat surface 41, and since the toes 45 are spherical or cylindrical in shape, the force directed against the surface 41 is always normal to this surface. It will be appreciated that the axis of generation of the vertical surface 41, is, in effect, at infinity and is always in horizontal alignment with each of the successive points of contact of the surface 41 and the toes 45 throughout the range of pivotal movement of the fork 42. The torque, or moment of the force, is by definition equal to the product of the force times the perpendicular distance from the line of action of the force to the axis of rotation. At the start of the first stage or increment of operation, this perpendicular distance or effective lever arm is represented by "A." The point of contact of the curved surface of each of the toes 45 with the surface 41 is designated at 70. As the thrust collar 40 is moved or axially displaced toward a clutch disengaging position, i.e. to the right as shown in FIG. 7, the points of contact of the curved surfaces of the toes 45 with the surface 41 drop lower. That is, after the collar 40 has moved through a displacement b, the points of contact have dropped to 71. Similarly, after moving through a displacement c the points of contact drop to 72, and through a displacement d to 73. The length of the active lever arm A increases correspondingly as the collar 40 is displaced. The lengths of the active lever arms for the points 71, 72, and 73 being represented by "B", "C", and "D," respectively. The loci of the points 70–73 describes an arc nearly the same as the radii of the shift yoke legs 44.

Figure 8:
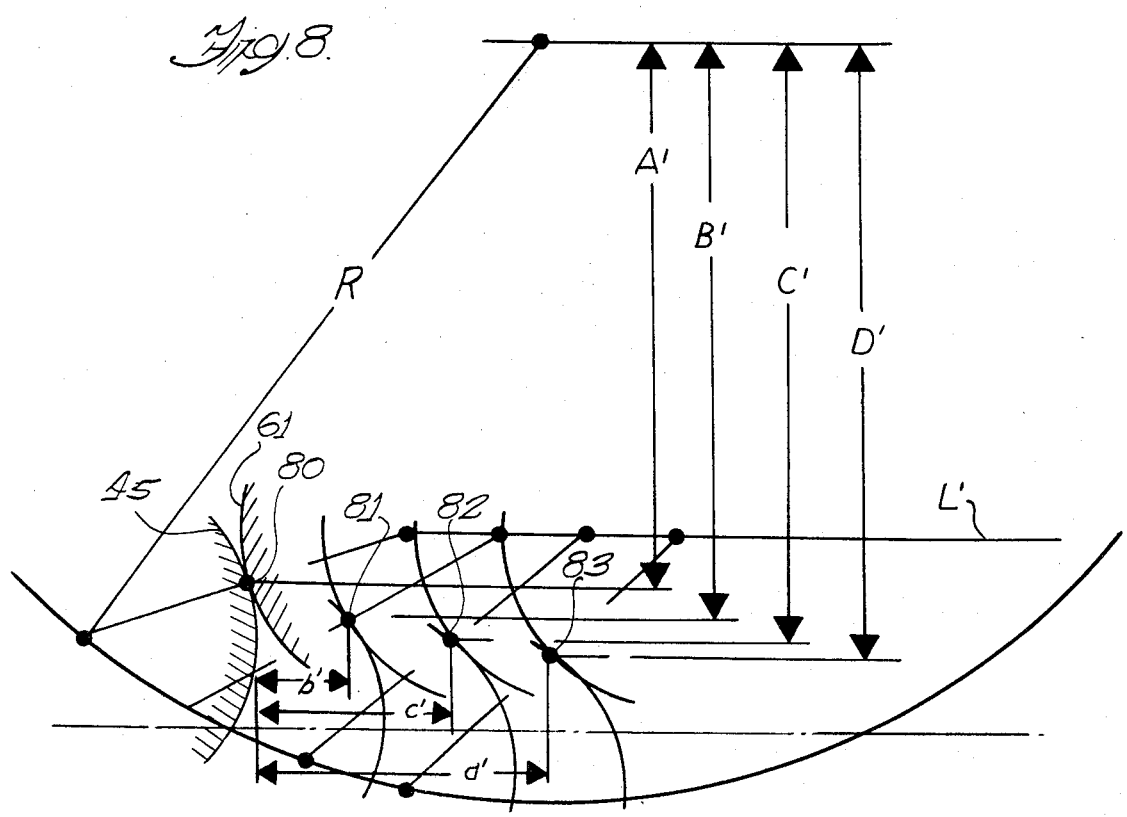
FIG. 8 is a schematic diagram illustrating the change in effective torque radius by employing the curved thrust plate insert of the present invention.

Referring to FIG. 8, there is illustrated a similar schematic diagram as in FIG. 7, showing the change in the torque parameters due to the inclusion of the curved surface inserts 10 on the thrust collar 40. The curved outer surface of the toe 45 of each leg 44 makes contact with a respective one of the raised cylindrical surfaces 61 at a point 80 slightly below the horizontal center line or longitudinal or curve generation axis "L" of the surfaces 61. For this point of contact 80, the active lever arm is represented by A'. As the collar 40 moves through an incremental displacement b', the point of contact moves to 81, and the lever arm becomes B'. Similarly, as the collar 40 sequentially moves through displacements of c' and d', which are substantially equal to the displacements c and d the points of contact become 82 and 83. The corresponding active lever arms are C' and D'. It will be appreciated that longitudinal axes of the surfaces 61 remain vertically above all the successive points of contact of the surfaces 61 and the outer surfaces of the toes 45 throughout the entire range of pivotal movement of the fork 42.

Thus, it can be seen that the curved surface of each toe 45 effectively tends to roll under a respective one of the curved surfaces 61, and the loci of the contact points 80–83 describes a much shallower arc than that shown in FIG. 7. In other words, the effective lengths of the active lever arms B', C', and D' are shortened correspondingly. This effective shortening of the active lever arms reduces the force required to move the thrust collar 40 axially or longitudinally against the biasing action of the clutch springs 28 to release the clutch 11. In practice, this reduction in force has been found to be as much as 8 to 10 percent.

While the structure shown and described is the preferred embodiment of the invention, it is to be understood that many changes and modifications can be made thereto without departing from the spirit of the invention. The invention is not to be considered as limited to this embodiment except insofar as the claims may be so limited.

What is claimed is:

1. Apparatus for manually disengaging a vehicle clutch having a spring-engaged friction pressure plate and a plurality of release levers for actuating the pressure plate to a release position corresponding to the disengaged condition of the clutch and a throwout bearing, said throw-out bearing being movable in one direction from a clutch engaged position along a predetermined axis for actuating the levers to effect actuation of the pressure plate to its release position, comprising:

convexly curved contact surface means fixed with respect to and movable in unison with said throw-out bearing;

and means for moving said throw-out bearing in said one direction from its clutch engaged position along said predetermined axis for actuating the levers to effect actuation of the pressure plate to its release position including a yoke mounted for pivotal movement between first and second positions corresponding to the engaged and disengaged conditions of the clutch, respectively, said yoke having convex contact surface means thereon operatively engageable with said first mentioned convexly curved contact surface means fixed with respect to said throw-out bearing during pivotal movement of said yoke from its first position to its second position.

2. Apparatus as set forth in claim 1, further including a thrust plate operatively connected to said throw-out bearing so as to be movable therewith, and wherein said first mentioned convexly curved contact surface means are carried by said thrust plate.

3. Apparatus as set forth in claim 2, wherein said thrust plate has substantially flat surface portions lying in a plane substantially normal to said predetermined axis, and said convexly curved contact surface means fixed with respect to said throw-out bearing incudes a pair of contact surfaces transversely spaced on respective opposite sides of a vertical plane containing said predetermined axis, said convex contact surfaces projecting from said thrust plate flat surface portions.

4. Apparatus as set forth in claim 3, wherein each of said convex contact surfaces projecting from said thrust plate flat surface portions is formed as an outer surface portion of an insert body, each of said insert bodies being detachably secured to a respective one of said thrust plate flat surface portions.

5. Apparatus as set forth in claim 3, wherein said convex contact surfaces projecting from said thrust plate flat surface portions are generally cylindrical in shape, the longitudinal axes of said cylindrical contact surfaces being substantially in alignment and extending substantially normal with respect to said predetermined axis.

6. Apparatus as set forth in claim 5, wherein said longitudinal axes of said cylindrical convex contact surfaces remain vertically spaced above the successive points of contact of said cylindrical convex contact surfaces and said yoke convex contact surface means throughout pivotal movement of said yoke between its first and second positions.

7. Apparatus as set forth in claim 1, wherein the axis from which said convexly curved contact surface means is generated remains vertically spaced above the successive points of contact of said convexly curved contact surface means and said yoke convex contact surface means throughout pivotal movement of said yoke between its first and second positions.

8. Apparatus as set forth in claim 7, wherein said yoke convex contact surface means includes a convexly shaped surface, said convexly shaped surface operatively engaging said first mentioned convexly curved surface means fixed with respect to said throw-out bearing during pivotal movement of said yoke from its first position to its second position.

9. Apparatus for manually disengaging a vehicle clutch having a spring-engaged friction pressure plate and a plurality of release levers for actuating the pressure plate to a release position corresponding to the disengaged condition of the clutch and throw-out bearing, said throw-out bearing being movable in one direction from a clutch engaged position along a predetermined axis for actuating the levers to effect actuation of the pressure plate to its release position, comprising:

convexly curved contact surface means fixed with respect to and movable in unison with said throw-out bearing, said contact surface means having an axis of generation substantially normal with respect to said predetermined axis;

and means for moving said throw-out bearing in said one direction from its clutch engaged position along said predetermined axis for actuating the levers to effect actuation of the pressure plate to its release position including a yoke mounted for pivotal movement about an axis substantially parallel with respect to said axis of generation between first and second positions corresponding to the engaged and disengaged conditions of the clutch, respectively, said yoke having convex contact surface means thereon operatively engageable with said first mentioned convexly curved contact surface means fixed with respect to said throw-out bearing during pivotal movement of said yoke from its first position to its second position, the axis of generation of said convexly curved contact surface means fixed with respect to said throw-out bearing remaining vertically spaced above the successive points of convexly curved contact of such convex contact surface means and said yoke contact surface means throughout pivotal movement of said yoke between its first and second positions.

10. Apparatus as set forth in claim 9, wherein said convexly curved contact surface means fixed with respect to said throw-out bearing includes a pair of convex contact surfaces spaced on respective opposite sides of a vertical plane containing said predetermined axis, and said pivotal axis of said yoke is vertically spaced above such convex contact surfaces.

11. Apparatus as set forth in claim 10, wherein said convexly curved contact surface means fixed with respect to said throw-out bearing and said yoke contact convex surface means include convexly shaped contact surfaces.

12. Apparatus as set forth in claim 11, wherein said axis of generation of said convexly curved contact surface means fixed with respect to said throw-out bearing extending substantially perpendicular with respect to said predetermined axis.

* * * * *